United States Patent
Lee et al.

(10) Patent No.: US 11,066,320 B2
(45) Date of Patent: Jul. 20, 2021

(54) COVER GLASS AND A MANUFACTURING METHOD THEREOF USING GLASS WOOL

(71) Applicant: SAMSUNG DISPLAY CO., LTD., Yongin-si (KR)

(72) Inventors: Tae Ho Lee, Hwaseong-si (KR); Atsushi Nemoto, Suwon-si (KR); Sun Hee Oh, Anyang-si (KR); Jun Woo You, Seongnam-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/389,649

(22) Filed: Apr. 19, 2019

(65) Prior Publication Data

US 2020/0031704 A1    Jan. 30, 2020

(30) Foreign Application Priority Data

Jul. 25, 2018    (KR) ........................ 10-2018-0086572

(51) Int. Cl.
| | |
|---|---|
| C03B 19/01 | (2006.01) |
| C03B 23/03 | (2006.01) |
| B33Y 80/00 | (2015.01) |
| B33Y 10/00 | (2015.01) |
| C03C 21/00 | (2006.01) |

(52) U.S. Cl.
CPC .............. *C03B 19/01* (2013.01); *B33Y 10/00* (2014.12); *B33Y 80/00* (2014.12); *C03B 23/03* (2013.01); *C03C 21/002* (2013.01)

(58) Field of Classification Search
CPC ......... C03B 19/01; C03B 23/03; C03B 19/02; C03B 23/20; C03B 23/0302; C03B 19/00; B33Y 80/00; B33Y 10/00; B33Y 40/20; C03C 21/002; C03C 2218/119; C03C 17/02; B29C 70/76

See application file for complete search history.

(56) References Cited

U.S. PATENT DOCUMENTS

| | | | |
|---|---|---|---|
| 9,701,562 B2 | 7/2017 | Wada et al. | |
| 2006/0257678 A1* | 11/2006 | Benson, Jr. | .......... G02B 5/3008 428/542.8 |
| 2007/0153384 A1* | 7/2007 | Ouderkirk | ................ G02B 1/14 359/487.02 |
| 2016/0039705 A1* | 2/2016 | Kato | ..................... C03B 35/145 428/174 |
| 2017/0064845 A1* | 3/2017 | Jung | ........................ H05K 5/03 |
| 2017/0304980 A1 | 10/2017 | Jotz et al. | |

* cited by examiner

*Primary Examiner* — Brian Handville
(74) *Attorney, Agent, or Firm* — F. Chau & Associates, LLC

(57) ABSTRACT

A method of manufacturing a cover glass is provided. The method comprises providing a glass base; forming a glass support portion by printing glass onto the glass base; and applying glass wool onto the glass support portion.

7 Claims, 13 Drawing Sheets

COVER GLASS AND A MANUFACTURING METHOD THEREOF USING GLASS WOOL

This application claims priority under 35 U.S.C. § 119 to Korean Patent Application No. 10-2018-0086572, filed on Jul. 25, 2018, in the Korean Intellectual Property Office, the disclosure of which is incorporated by reference herein in its entirety.

TECHNICAL FIELD

The present invention relates to a cover glass and a manufacturing method thereof, and more particularly, to a cover glass with a bent portion and a manufacturing method thereof using glass wool.

DESCRIPTION OF THE RELATED ART

Cover glass may be used to protect display panels. Display panel integrity may be negatively impacted by fingerprints, scratches, or the like, and may be damaged by external factors such as moisture and dust. The cover glass is installed at a front surface of a display panel, such as an organic light emitting diode (OLED) a liquid crystal display (LCD), or a plasma display panel (PDP). The cover glass is designed to permit a user's input to be transmitted to the device, and for an output of a device to be observed by the user. Attempts have been made to achieve various cover glass designs to accommodate different display panel shapes.

SUMMARY

An exemplary embodiment of the present invention discloses a method of manufacturing a cover glass. The method comprises providing a glass base. A glass support portion is formed by printing glass onto the glass base. Glass wool is applied to the glass support portion.

An exemplary embodiment of the present invention discloses a method of manufacturing a cover glass. The method comprises forming a glass base by glass printing. Glass wool is applied onto a surface of the glass base. The applied glass wool is melted to form molten glass wool. The glass printing is performed using a 3D printer. A diameter of the molten glass wool is in a range of 400 nm to 900 nm.

An exemplary embodiment of the present invention discloses a cover glass including glass wool. The cover glass comprises a first area and at least one second area connected to the first area bent from the first area. The density of glass wool in the first area may be equal to or greater than a density of glass wool in the second area.

BRIEF DESCRIPTION OF THE DRAWINGS

The above and other features of the present invention will become more apparent by describing exemplary embodiments thereof in detail with reference to the attached drawings, in which.

DETAILED DESCRIPTION OF THE EMBODIMENTS

Figure 1:
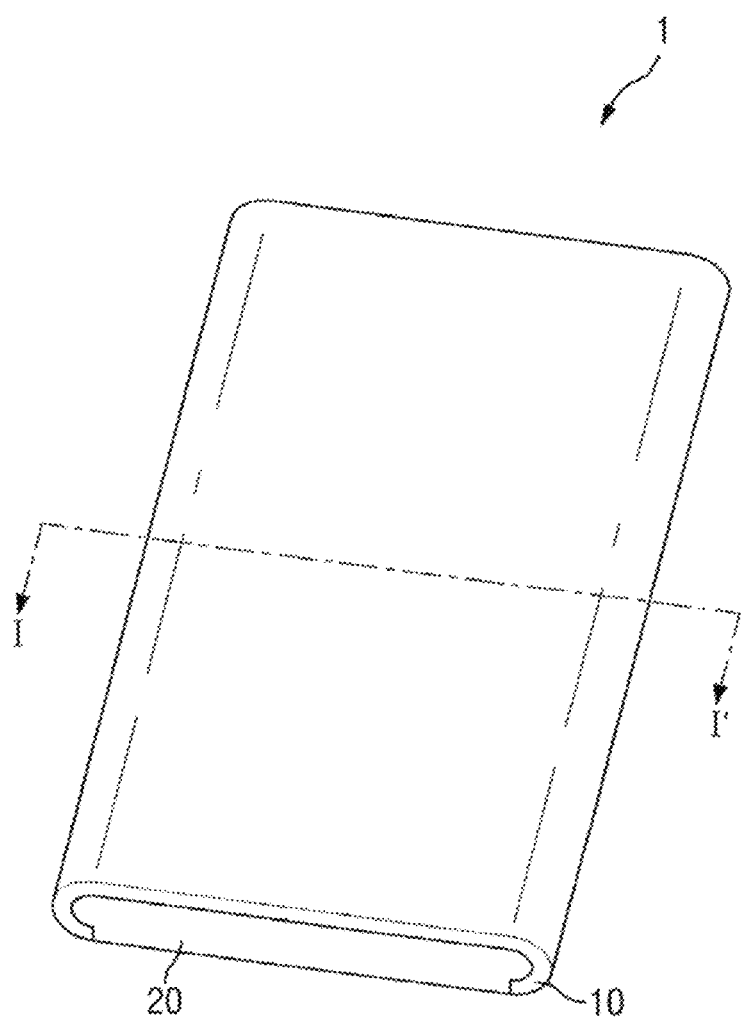
FIG. 1 is a perspective view of a cover glass according to an exemplary embodiment of the present invention attached to a display device.

Exemplary embodiments of the present invention will be described more fully hereinafter with reference to the accompanying drawings. However, the present invention may be embodied in many different forms and should not be construed as being limited to the embodiments set forth herein.

It will be understood that when an element or layer is referred to as being "disposed on", "connected to", or "coupled to" another element or layer, it can be directly on, connected to, or coupled to the other element or layer, or intervening elements or layers may be present. It will be understood that like reference numerals may refer to like elements throughout the detailed description.

FIG. 1 is a perspective view of a display apparatus with a cover glass according to an exemplary embodiment of the present invention.

Referring to FIG. 1, a display apparatus 1 includes a display panel 20 and a cover glass 10.

The display panel 20 displays an image. The display panel 20 may include various display panels 20 such as an organic light emitting display panel, a liquid crystal display panel, a plasma display panel, an electrophoretic display panel, or an electrowetting display panel.

The display panel 20 may include one flat central surface and curved surfaces formed at different sides of the flat central surface, as has been illustrated in FIG. 1. However, the display panel 20 is not limited thereto. For example, the display panel 20 may also include a flat central surface without curved portions formed at sides thereof.

The cover glass 10 is disposed on one surface of the display panel 20. For example, the cover glass 10 may be disposed on one surface of the display panel 20 so that the cover glass 10 covers at least a portion of the display panel 20. According to an exemplary embodiment of the present invention, the cover glass 10 may be disposed to overlap an upper surface of the display panel 20. For example, the cover glass 10 may be provided in a shape including a flat central portion and curved surfaces formed at parallel sides of the flat central portion. The display panel 20 may be damaged by fingerprints, scratches, or the like, and may be damaged by external factors such as moisture and dust. The cover glass 10 protects the display panel 20.

Figure 2:
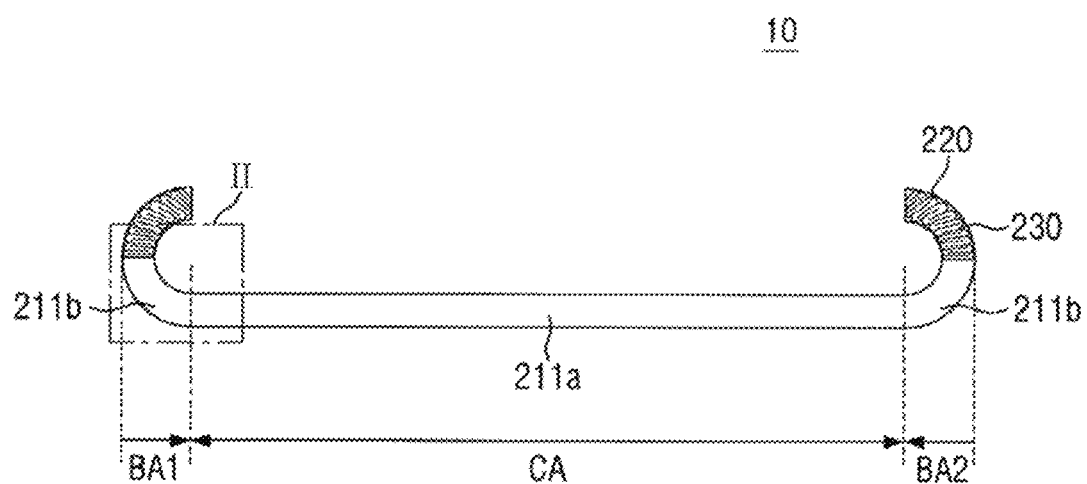
FIG. 2 is a cross-sectional view of the cover glass according to an exemplary embodiment of the present invention.

FIG. 2 is a cross-sectional view of the cover glass according to an exemplary embodiment of the present invention. The cross-sectional view illustrated in FIG. 2 shows a cross-section of the cover glass 10 taken along line I-I' in FIG. 1 and turned upside down.

Each element of the cover glass 10 is shown as being clearly distinguishable in FIG. 2, but may not necessarily be recognized as so without using a mechanism capable of magnification (for example, an electronic microscope). For convenience of description, each element of the cover glass 10 is exaggeratedly illustrated to be divided by discrete solid line boundaries.

The cover glass 10 may include a double curvature edge structure. The cover glass 10 includes a central area CA and bent areas BA1 and BA2. The bent areas BA1 and BA2 are areas in which the cover glass 10 is bent. Bent areas BA1 and BA2 are disposed at sides of the central area CA. For example, the cover glass 10 may include a first bent area BA1 connected to the left side of the central area CA, and a second bent area BA2 connected to the right side of the central area CA. Each of the bent areas BA1 and BA2 further includes a base 211b, a support portion 220 disposed on the base 211b, and a cover portion 230 disposed on the support portion 220.

Since visual information from the display panel 20 is observed through the cover glass 10 by the user, the cover glass 10 may be formed of a glass, plastic, or similar material having high transparency. In addition, to withstand an external impact that may occur in everyday life, the cover glass 10 may be formed of a tempered glass, reinforced plastic, or similar material. The central area CA is an area between the first bent area BA1 and the second bent area BA2, and may connect to the bent areas BA1 and BA2. The central area CA of the cover glass 10 includes a central portion 211a configured to support the base 211b disposed on each of the bent areas BA1 and BA2.

The base 211b of the bent areas BA1 and BA2 and the central portion 211a of the central area CA have been referred to separately for convenience of description, but the base 211b and the central portion 211a may be integrated. In an exemplary embodiment of the present invention, the base 211b and the central portion 211a may comprise a glass base for manufacturing the support portion 220 using a three-dimensional (3D) printer 300 (see FIG. 7). The central portion 211a may be a structure that serves as a foundation for the support portion 220. The central portion 211a may also serve as the base for the base 211b. In other words, the glass base might only include the central portion 211a or may include both the base 211b and the central portion 211a.

In an exemplary embodiment of the present invention (as illustrated in FIG. 2) the central portion 211a of the cover glass 10 may have a flat shape. The central portion 211a may include a flat upper surface and lower surface. The central portion 211a may have a predetermined thickness. According to an exemplary embodiment of the present invention, the thickness of the central portion 211a may be in a range of 0.1 mm to 0.7 mm. However, the central portion 211a is not limited to a flat shape. According to an exemplary embodiment of the present invention, the central portion 211a may have a bent shape like the bent areas BA1 and BA2 such that the cover glass 10 may have a curved shape.

The bent areas BA1 and BA2 may have a bent shape and are formed at different sides of the central area CA n which the cover glass 10 has a flat shape. In FIG. 2, the bent areas BA1 and BA2 are illustrated as being formed at the left and right sides of the central area CA, but embodiments of the present invention are not limited thereto. In an exemplary embodiment of the present invention, the bent areas BA1 and BA2 may be formed at only one of the left or right sides of the central area CA, or may be formed on top and bottom sides of the central area CA.

Referring to the embodiment depicted in FIG. 2, the bent areas BA1 and BA2 may be formed at the left and right sides of the central area CA respectively, or vice versa.

The first bent area BA1 may be disposed on the left side of the central area CA. The first bent area BA1 includes the base 211b, the support portion 220 disposed on the base 211b, and the cover portion 230 disposed on a surface of the support portion 220.

The base 211b may refer to a bent portion of the cover glass 10 extending from a side of the central area CA of the cover glass 10 to a portion at which the support portion 220 begins to be formed in either the first bent area BA1 or the second bent area BA2. As described above, the central portion 211a and the base 211b may be integrally formed instead of being physically distinguished from each other. The base 211b may have a double curvature and a shape that is bent substantially in one direction. The base 211b may be a foundation structure for forming the support portion 220 thereon, and a side surface of the base 211b may have a flat shape. However, the base 211b may be omitted. For example, the support portion 220 may be formed above sides of the flat central portion 211a.

The support portion 220 may be formed on a side surface of the base 211b. The support portion 220 may be continuously formed outward from the side surface of the base 211b. The support portion 220 may have a shape that is bent substantially in the same direction as the base 211b. For example, the support portion 220 may be bent toward the flat central portion 211a. However, embodiments of the present invention are not limited thereto. According to an exemplary embodiment of the present invention, the support portion 220 may have a shape that is bent in a substantially different direction from that which the base 211b is bent. The support portion 220 may be formed by a 3D printer 300. This will be described in detail below. From a cross sectional vantage, the support portion 220 may have a shape of a continuous wire wound in one or more turns across left and right portions and stacked such that the height of the support portion 220 is increased. The wire may be stacked such that the support portion 220 has a shape that is substantially bent. Accordingly, the support portion 220 may have a substantially double curvature. However, the shape of the support portion 220 is not limited thereto, and the support portion 220 may also have a shape in which the height thereof is increased as glass plates are laminated.

Figure 3:
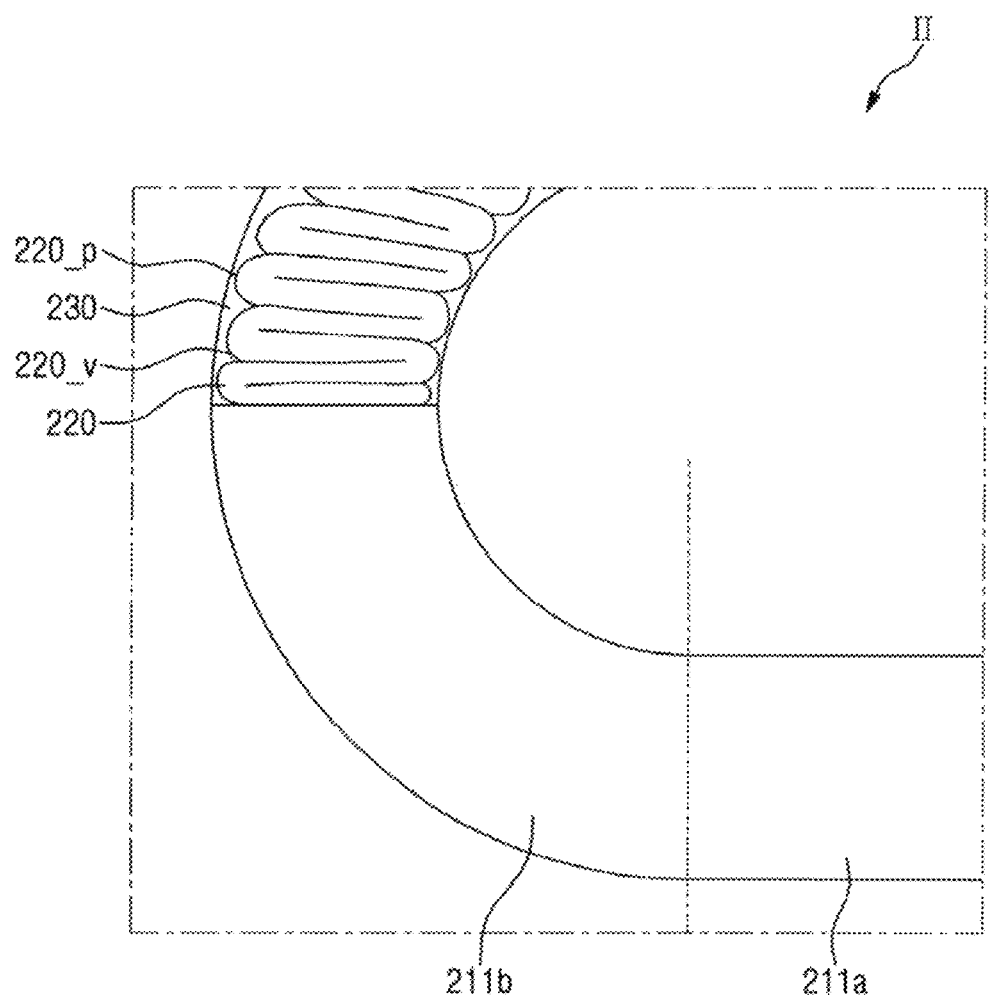
FIG. 3 is an enlarged view of area II in FIG. 2 according to an exemplary embodiment of the present invention.

FIG. 3 is an enlarged view of area II in FIG. 2. Referring to FIG. 3, the support portion 220 may include a curved surface. The support portion 220 may include a plurality of valleys 220_v that are depressed toward the inside of the cover glass 10 and a plurality of protrusions 220_p that are formed between the valleys 220_v and protrude toward the outside of the cover glass 10. Due to the protrusions 220_p and the valleys 220_v of the support portion 220, the surface of the support portion 220 may have a constant surface roughness.

The cover portion 230 may be disposed on a surface of the support portion 220. The cover portion 230 may be disposed on the support portion 220. The cover portion 230 may smooth the cover glass 10. The cover portion 230 may fill the valleys 220_v formed between the protrusions 220_p and neighboring protrusions 220_p of the support portion 220 and decrease the constant surface roughness of the support portion 220. In the case in which the cover portion 230 is formed in the cover glass 10, the cover glass 10 may be manufactured so that a height of the protrusion 220_p with respect to the valley 220_v of the cover glass 10 due to the cover portion 230 is 2.05 μm or less. According to an exemplary embodiment of the present invention, the height of the protrusion 220_p with respect to the valley 220_v due to the cover portion 230 may be in a range of 1.85 μm to 2.05 μm.

The bent areas BA1 and BA2 including the base 211b, the support portion 220, and the cover portion 230 may have a substantially C-shape. In this case, ends of the bent areas BA1 and BA2 may overlap the central area CA. In the present specification, when it is mentioned that certain configurations "overlap with" each other, this may mean that two configurations overlap with each other in a thickness direction of the cover glass 10 (e.g., in FIG. 2, a direction perpendicular to the surface of the cover glass 10 in the central area CA). In other words, the ends of the bent areas BA1 and BA2 may be bent further inward toward the central area CA. In the case in which the cover glass 10 is manufactured using the 3D printer 300, the cover glass 10 may be implemented in any shape.

Next, a manufacturing method of the cover glass 10 will be described.

Figure 4:
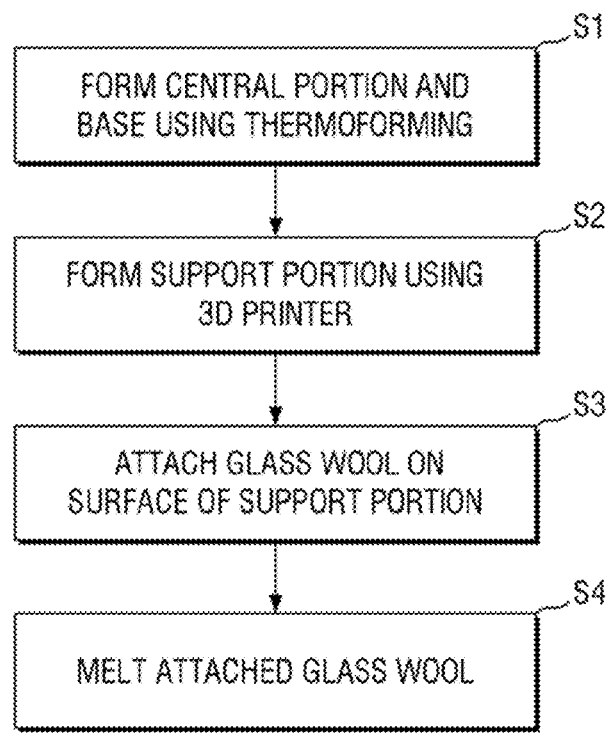
FIG. 4 is a flowchart illustrating a process of manufacturing the cover glass in FIG. 2 according to an exemplary embodiment of the present invention.

FIG. 4 is a flowchart illustrating a process of manufacturing the cover glass 10 in FIG. 2, and FIGS. 5 to 9 are cross-sectional views illustrating the process of manufacturing the cover glass 10 in FIG. 2

Referring to FIG. 4, the cover glass 10 may be substantially manufactured by forming the central portion 211a and the base 211b using thermoforming (S1), forming the support portion 220 using the 3D printer 300 (S2), attaching glass wool 230a to a surface of the support portion 220 (S3), and melting the attached glass wool 230a (S4). In the present specification, "melting" may refer to applying heat to a solid object so that the solid object reaches a molten state.

Figure 5:
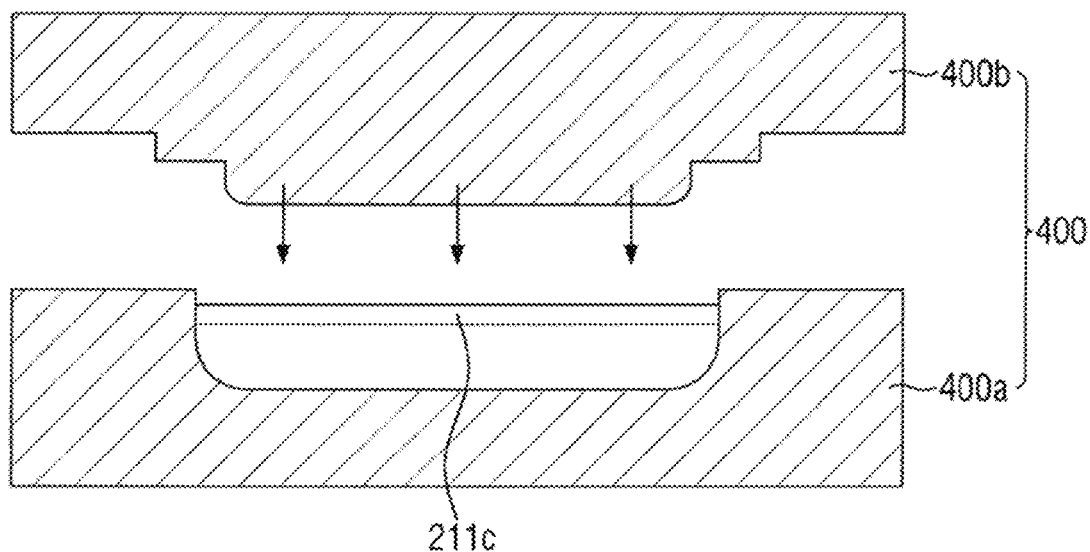
FIGS. 5, 6, 7, 8, and 9 are cross-sectional views illustrating the process of manufacturing the cover glass in FIG. 2 according to an exemplary embodiment of the present invention.
Figure 6:
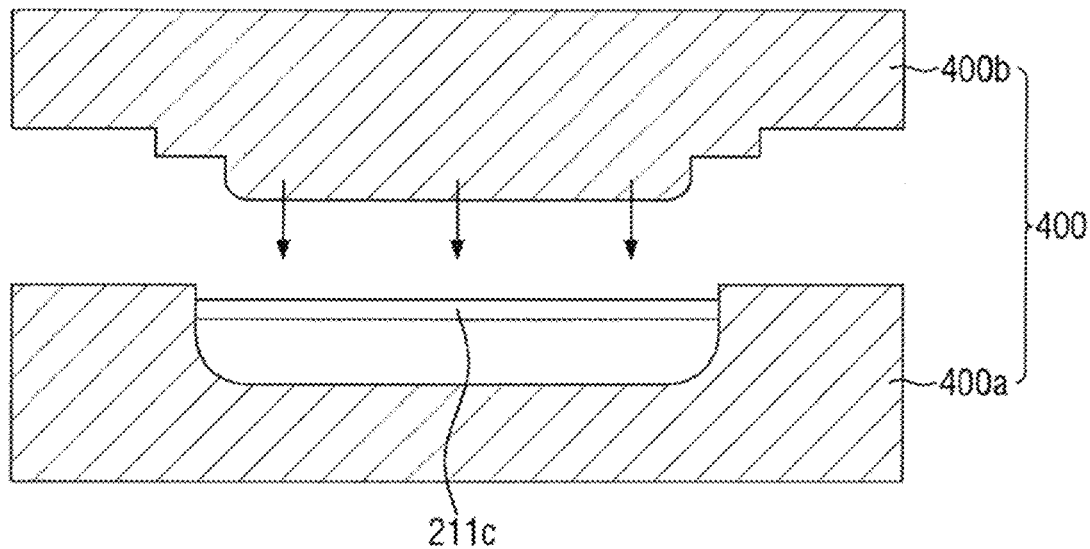

Referring to FIGS. 5 and 6, the central area CA and the base 211b of the cover glass 10 may be formed using thermoforming. Thermoforming may be a forming method in which a mold 400 is used to apply pressure and heat to form the cover glass 10. When the mold 400 is heated while a glass substrate 211c is accommodated therein, the central portion 211a and the base 211b may be formed. The mold 400 may include an upper mold 400b and a lower mold 400a.

The glass substrate 211c may be a glass plate including $SiO_2$. The glass substrate 211c may include a material which is the same as a raw material 220a of the support portion 220 which will be described below. The glass substrate 211c may include $SiO_2$ and further include one or more combinations of materials constituting the raw material 220a.

Shapes of the central portion 211a and the base 211b are formed in the mold 400. For example, the shapes of the central portion 211a and the base 211b may be embossed in an upper portion of the upper mold 400b or formed in intaglio. The shape of the central portion 211a and the base 211b may also be embossed or formed in intaglio in the lower mold 400a. In a case in which the upper mold 400b and a lower mold 400a physically contact, a space having the shape of the glass substrate 211c may be present between the upper mold 400b and the lower mold 400a.

The glass substrate 211c is disposed on a portion of the lower mold 400a. The lower mold 400a may accommodate the glass substrate 211c. The glass substrate 211c may be tilted at a predetermined angle with respect to a horizontal surface of the intaglio portion of the lower mold 400a or may be parallel with the horizontal surface.

Next, the lower portion of the upper mold 400b may be disposed to be adhered to the upper portion of the lower mold 400a. By the upper mold 400b being adhered to the lower mold 400a, heat may be uniformly transferred from the mold 400 to the glass substrate 211c.

After the upper mold 400b is connected to the lower mold 400a, the mold 400 may be heated to a temperature at which the glass substrate 211c can be formed. The glass substrate 211c may be formed along the embossed shape of the upper mold 400b and the intaglio shape of the lower mold 400a.

The central portion 211a and the base 211b of the cover glass 10 may be formed using the above method. However, the method and process for forming the central portion 211a and the base 211b of the cover glass 10 are not limited thereto. The central portion 211a and the base 211b of the cover glass 10 may be formed by various other methods and processes.

Figure 7:
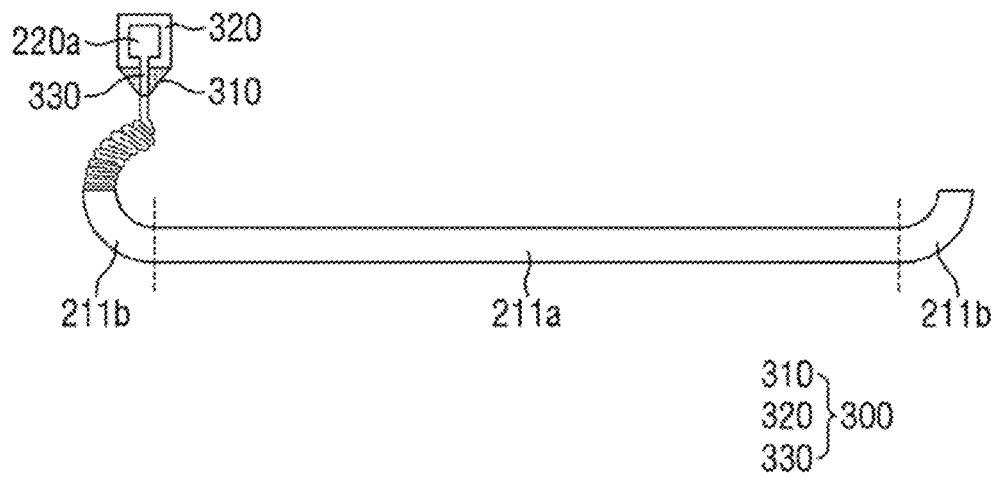
Figure 8:
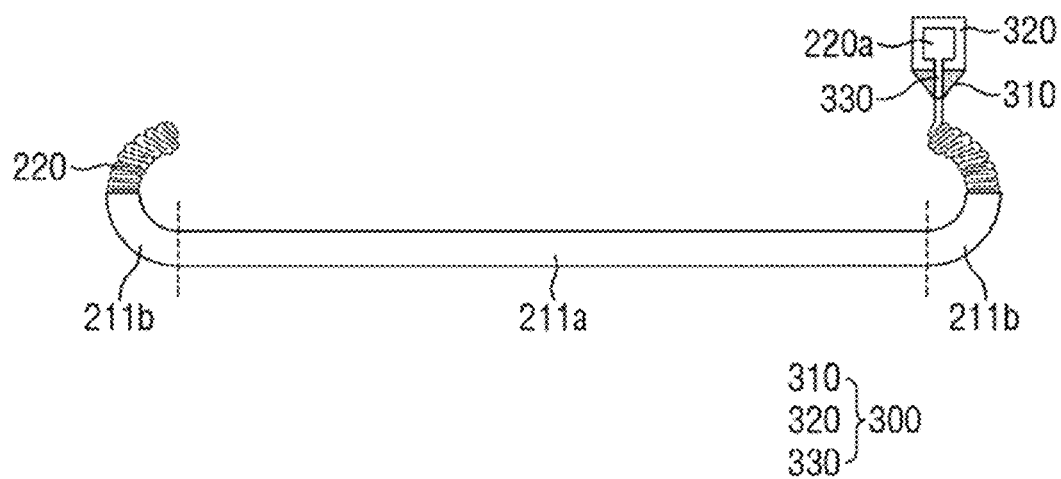

Referring to FIGS. 7 and 8, a method of forming the support portion 220 on the base 211b will be described. After the central portion 211a and the base 211b of the cover glass 10 are formed, the support portion 220 may be formed on a side surface of the base 211b. After the support portion 220 is formed, the cover portion 230 may be formed. After the support portion 220 is formed using the 3D printer 300, the cover portion 230 may be formed using the glass wool 230a.

A method of forming the support portion 220 on the base 211b will be described.

The 3D printer 300 may be used to form the support portion 220. The 3D printer 300 may use 3D data to form a target object. The 3D printer 300 may include a raw material feeding portion 320 configured to feed the raw material 220a, and a print head portion 310 including a nozzle 330 capable of discharging the raw material 220a.

In an exemplary embodiment of the present invention, the raw material 220a may be glass in a molten state. The raw material 220a may be transformed into a molten state by exposure to a high temperature ranging from 400° C. to 1100° C. The raw material 220a may include $SiO_2$. For example, the raw material 220a may include $SiO_2$, and further include MgO, $Al_2O_3$, $SiO_2$, $K_2O$, F, $ZrO_2$, CoO, $Cr_2O_3$, and/or $MnO_2$ in a predetermined weight ratio. For example, the raw material 220a may be formed of molten glass including 10.0 to 15.0 wt % of MgO, 5.0 to 20.0 wt % of $Al_2O_3$, 45.0 to 55.0 wt % of $SiO_2$, 5.0 to 10.0 wt % of $K_2O$, and 5.0 to 10.0 wt % of F.

The print head portion 310 may include an inlet through which the raw material 220a is introduced from the raw material feeding portion 320, and the nozzle 330 configured to discharge the raw material 220a by a predetermined amount. The print head portion 310 may further include a heater configured to heat the raw material 220a introduced through the inlet, and a melting furnace, which is a space in which the raw material 220a is melted, connected to the nozzle 330.

The nozzle 330 may include an outer frame formed of a heat-resistant material and an inner frame in the shape of a funnel. The inner frame may be formed of platinum (Pt) or graphite with a low contact angle so that a phenomenon in which molten glass adheres to the inner frame is minimized, or may be formed of a material whose surface is coated with Pt or diamond-like carbon (DLC).

A diameter of the nozzle 330 may be in a range of 10 μm to 100 μm. A viscosity of the raw material 220a discharged from the nozzle 330 may have a $10^3$ to $10^{10}$ poise range.

Manufacturing the support portion 220 using the 3D printer 300 includes a step for extracting coordinate values corresponding to the actual size of a 3D object using 3D modeling from a model which is created into a 3D image. Numerical coordinate values corresponding to the actual size of the 3D object may be obtained by using a 3D modeling program. In other words, the 3D model may be enlarged to correspond to the actual size of the 3D object. 3D coordinate values may be extracted from the 3D model by utilizing a 3D scanning apparatus.

Next, cross-sectional data may be extracted. A thickness corresponds to a predetermined hardness difference interval of the 3D model based upon the extracted coordinate values.

Next, a step of manufacturing the support portion 220, which is a basic structural frame of the first bent area BA1 and the second bent area BA2, may be performed using data converted into an actual 3D image of the 3D object through the 3D printer 300.

The raw material 220a may be formed into a 3D support portion 220 as the raw material 220a is sprayed from the nozzle 330 onto the base 211b and the position of the print head portion 310 is adjusted. The print head portion 310 sprays the raw material 220a while moving in vertical and horizontal directions to form a predetermined shape of the support portion 220. It is to be understood that the cover glass 10 may be formed into almost any shape by using the 3D printer. In an exemplary embodiment of the present invention, by the print head portion 310 spraying the raw material 220a while repeatedly moving in the horizontal direction, the support portion 220 may be made to have a plurality of protrusions 220_p and valleys 220_v repeatedly formed, and to have a curved shape bent substantially in one direction.

The support portion 220 is illustrated in the drawings as having the shape in which an unbroken wire is repeatedly wound in the horizontal direction such that the height of the support portion 220 is increased, but the present invention is not limited thereto. For example, the support portion 220 may have a shape in which wires are stacked in layers. When the support portion 220 is manufactured in such a shape, a method in which the print head portion 310 repeatedly moves leftward and rightward but sprays the raw material 220a only when moving in the left and right directions may be used.

After the support portion 220 is formed in the first bent area BA1, the support portion 220 may be formed in the second bent area BA2 through a process which is the same as the process of forming the support portion 220 in the first bent area BA1. It is illustrated in the drawings that the support portion 220 is sequentially formed in the first bent area BA1 and the second bent area BA2, but embodiments of the present invention are not limited thereto. For example, the support portion 220 may be simultaneously formed in the first bent area BA1 and the second bent area BA2.

The process of using the 3D printer 300 is not limited to the above-described means. For example, the support portion 220 may be manufactured using other types of 3D printers 300 that are operated using various other processes. For example, a 3D printer 300 may be used in which an output is controlled by 3D modeling using a Stereo Lithographic Apparatus (SLA), Selective Laser Sintering (SLS), Laminated Object Manufacturing (LOM), Ballistic Particle Manufacturing (BPM), and the like. The type of 3D printer 300 to be used may be selected according to the size and shape of the support portion 220 to be manufactured.

After the support portion 220 is manufactured, the cover portion 230 may be formed.

Figure 9:
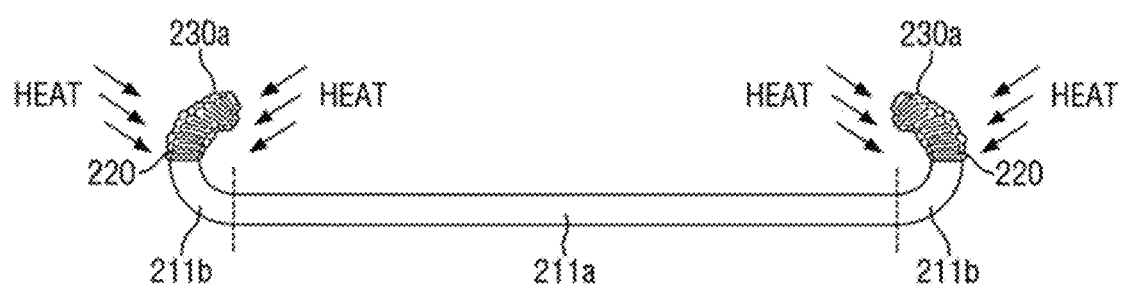

Referring to FIG. 9, the cover portion 230 may be formed through a process of applying and attaching the glass wool 230a to the surface of the support portion 220, a process of melting the attached glass wool 230a, a process of cooling the molten glass wool 230b (shown for example in FIG. 10), and an annealing process.

The glass wool 230a may be manufactured by a method in which molten glass is formed into filaments by a centrifugal force, the filaments are collected as a wool aggregate while a binder is sprayed. The binder is hardened to form a wool mat, and the glass wool mat is crushed into small, irregular-shaped materials. However, the glass wool 230a used in forming the cover portion 230 is not limited to the glass wool 210a manufactured using the above-described manufacturing method. The glass wool 230a may include various other types of glass wool 230a manufactured using various other methods.

The glass wool 230a may be an aggregate of pieces of thread-like glass having a fine diameter. In an exemplary embodiment of the present invention, the diameter of each piece of glass may be in a range of 1 μm to 8 μm. The glass wool 230a described herein may be different from glass fiber. The glass wool 230a may have a smaller diameter and shorter length in comparison to glass fiber. The diameter and length of molten glass wool 230b (see FIG. 10) are different from the length and diameter of molten glass fibers 232 (see FIG. 11). This will be described below with reference to FIGS. 10 and 11.

The glass wool 230a may have the shape of cotton wool. In other words, the shape of the glass wool 230a may be similar to the shape of a cloud.

As illustrated later in FIG. 14, the glass wool 230a is applied on the plurality of valleys 220_v of the support portion 220. The glass wool 230a may also be applied to the protrusions 220_p. In order to form the glass wool 230a on the surface of the support portion 220, the process of forming the cover portion 230 may be performed in a chamber in which temperature is 400° C. or higher.

To facilitate attachment of the glass wool 230a to the cover portion 230, an additive may be further included in the glass wool 230a. The additive may include an acrylic polymer having an isobutyl group and a hydroxyl group and further include other smoothing agents, adhesives, and plasticizers. In an exemplary embodiment of the present invention, a molecular weight of the acrylic polymer may be in a range of 10,000 g/mol to 600,000 g/mol.

After the glass wool 230a is attached to the surface of the support portion 220, heat is applied to the attached glass wool 230a using a method of radiating flames or laser to the attached glass wool 230a to melt the attached glass wool 230a. After the glass wool 230a is melted, a cooling process is performed. After the cooling process, the annealing process is performed. In an exemplary embodiment of the present invention, the annealing process may be performed at a temperature ranging from 500° C. to 1000° C.

Figure 10:
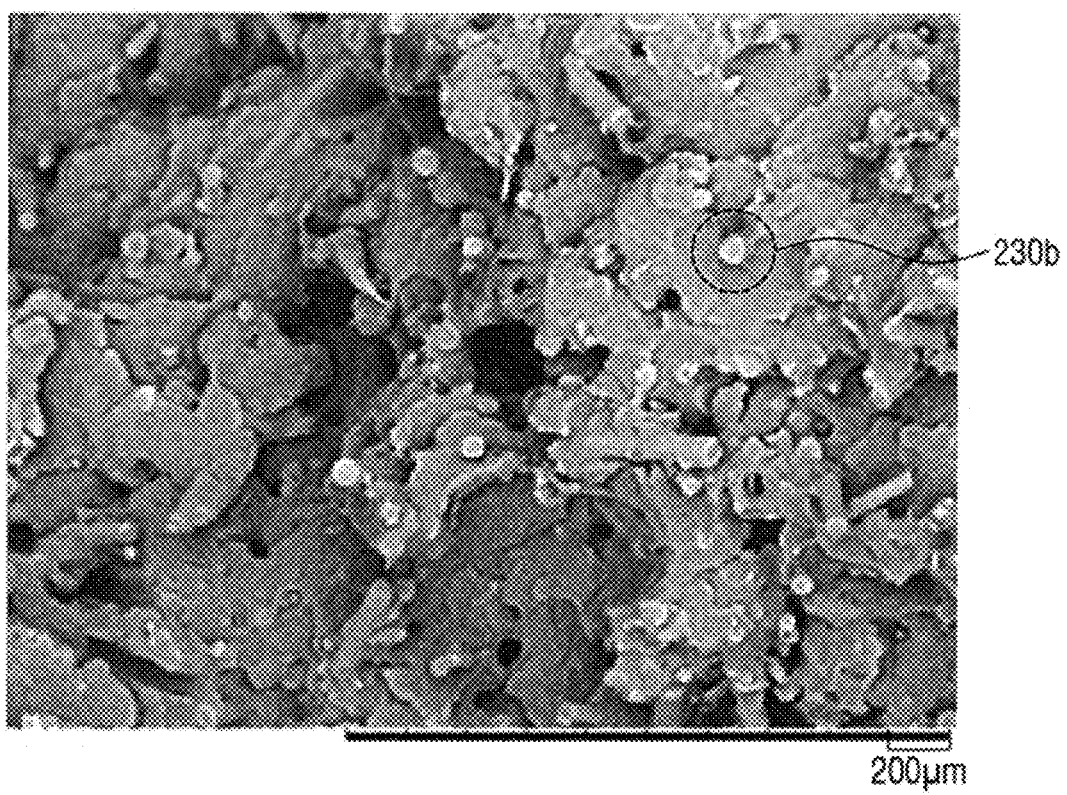
FIG. 10 is an enlarged photograph of a cover portion of the cover glass according to an exemplary embodiment of the present invention.

The cover portion 230 manufactured by the above-described method may include a plurality of pieces of molten glass wool 230b shown in FIG. 10.

To reduce a surface roughness of the cover portion 230, the process of forming the cover portion 230 may further include a polishing process. In an exemplary embodiment of the present invention, the polishing process may be a flame polishing process or laser polishing process but is not limited thereto.

The method of manufacturing the cover glass 10 may further include, after the manufacturing processes associated with FIGS. 4 to 8, a glass strengthening process. For example, the glass strengthening process may be a process performed immediately before and/or after the above-mentioned polishing process. The glass strengthening process may use an ion exchange method. The ion exchange method may be a method in which one alkali ion present in the cover glass 10 is exchanged with an alkali ion having a size larger than that of the one alkali ion. In an exemplary embodiment of the present invention, the cover glass 10 may be strengthened by exchanging lithium ions Li+ and sodium ions Na+ present in the cover glass 10 with sodium ions Na+ and potassium ions K+, respectively. In an exemplary embodiment of the present invention, the ion exchange method may include a primary ion exchange process and a secondary ion exchange process.

Figure 11:
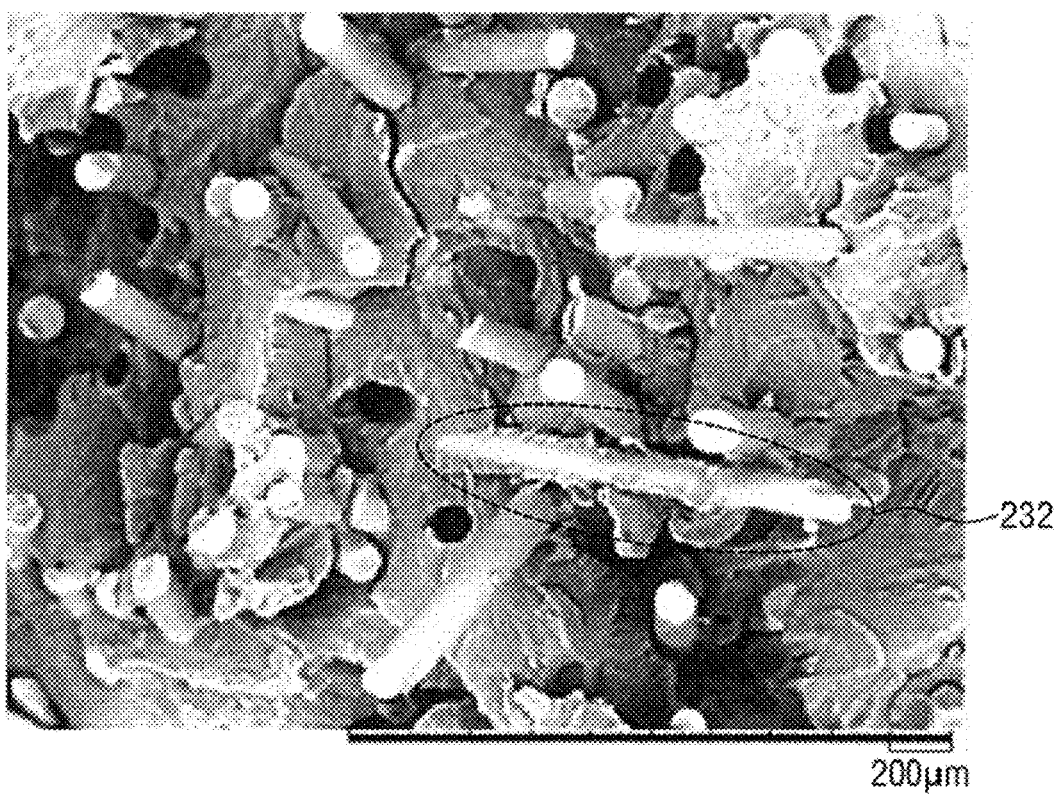
FIG. 11 is an enlarged photograph of a cover portion of a cover glass in which glass fibers are melted in a support portion, as a comparative example.

FIG. 10 is an enlarged photograph of the cover portion 230 of the cover glass 10 according to an exemplary embodiment of the present invention, and FIG. 11 is an enlarged photograph of a cover portion of a cover glass in which glass fibers are melted in a support portion, as a comparative example.

Referring to FIG. 10, the cover portion 230 includes the plurality of pieces of molten glass wool 230b. The molten glass wool 230b may have a somewhat fine size. In an exemplary embodiment of the present invention, the size of the molten glass wool 230b (e.g., the diameter and length of the molten glass wool 230b) may be in a range of 1 μm to 10 μm. However, embodiments of the present invention are not limited thereto, and the height of the protrusion 220_p with respect to the valley 220_v of the cover glass 10 may be 1 μm or less. The size (diameter and length) of the molten glass wool 230b may be in a range of 400 nm to 900 nm. In contrast, referring to FIG. 11, the size of the molten glass fibers 232 (e.g., the length of the molten glass fibers 232) may be about 20 μm or greater.

As shown in the photographs of FIGS. 10 and 11, in the case in which the cover portion 230 is manufactured using the glass wool 230a, the cover portion may include molten glass wool 230b having a relatively small diameter and relatively short length. As compared with the comparative example in FIG. 11, the cover portion 230 of the cover glass 10 according to an exemplary embodiment of the present invention may have a smoother surface due to the molten glass wool 230b.

Next, a cover glass 10 according to another embodiment of the present invention will be described. In describing the other embodiment, descriptions overlapping with those given above with reference to FIGS. 1 to 9 may be omitted. The same reference numerals may be used for configurations identical to those described above with reference to FIGS. 1 to 9.

Figure 12:
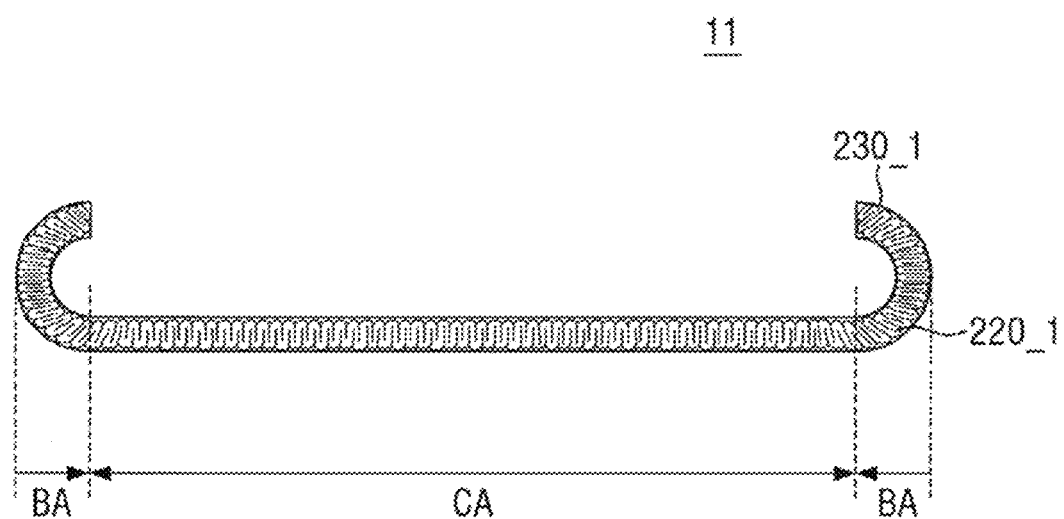
FIG. 12 is a cross-sectional view of a cover glass according to an exemplary embodiment of the present invention.
Figure 13:
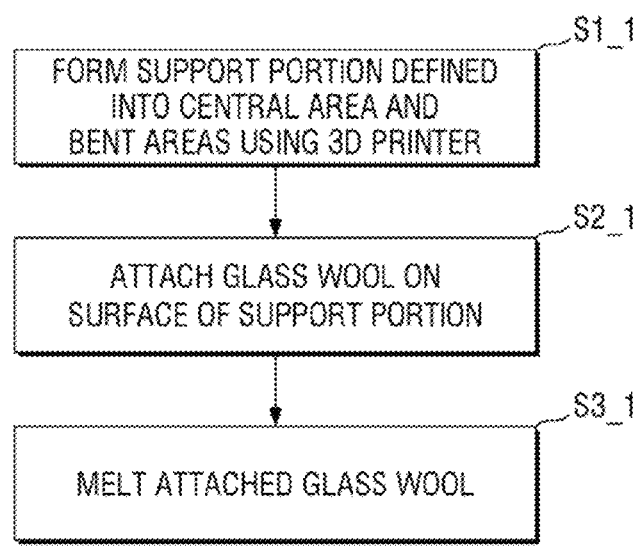
FIG. 13 is a flowchart illustrating a process of manufacturing the cover glass in FIG. 12 according to an exemplary embodiment of the present invention.

FIG. 12 is a cross-sectional view of a cover glass according to an exemplary embodiment of the present invention. FIG. 13 is a flowchart illustrating a process of manufacturing the cover glass in FIG. 12. FIGS. 14 and 15 are cross-sectional views illustrating parts of the process of manufacturing the cover glass in FIG. 12.

Figure 14:
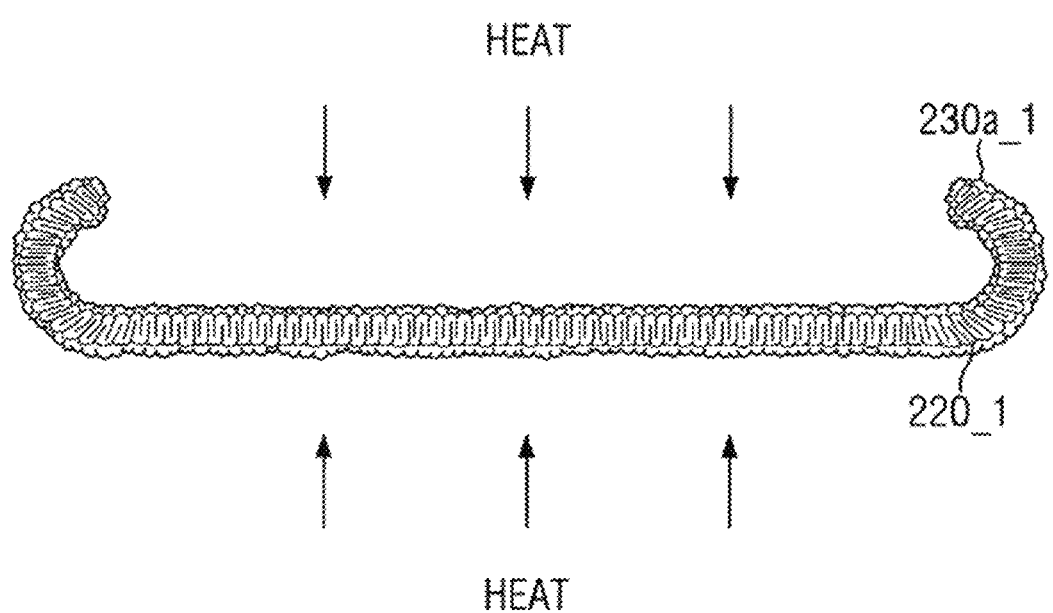
FIGS. 14 and 15 are cross-sectional views illustrating parts of the process of manufacturing the cover glass in FIG. 12 according to an exemplary embodiment of the present invention.
Figure 15:
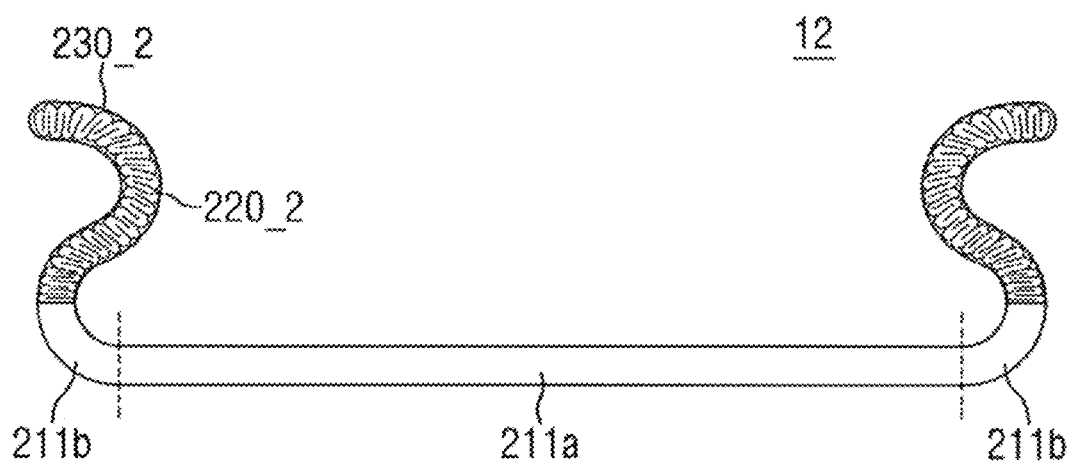

Referring to FIGS. 12 to 14, a cover glass 11 according to the present embodiment differs from the cover glass 10 according to the embodiment illustrated in FIG. 2 in that all of the central area CA and the bent areas BA1 and BA2 include the support portion 220_1 and the cover portion 230_1.

For example, the cover glass 11 shown in FIG. 12 may only include the support portion 220_1 and the cover portion 230_1. An area divided into the above-described central area CA and bent areas BA may be defined in the support portion 220_1 and the cover portion 230_1. FIG. 13 provides a flowchart of the manufacturing process for cover glass 11. The cover glass 11 may be substantially manufactured by forming the support portion 220_1, which may be defined into the central area CA and bent areas BA1 and BA2 using the 3D printer 300 (S1_1). Glass wool 230a_1 (shown in FIG. 14) may be disposed on the surface of the support portion 220_1 (S2_1). The density of glass wool in the first area may be equal to or greater than a density of glass wool in the second area. The attached glass wool 230a_1 may then be melted (S3_1).

The support portion 220 may include the central area CA formed to be substantially flat. The first bent area BA1 formed at one side of the central area CA and is bent substantially in one direction. The second bent area BA2 which is formed at the other side of the central area CA is bent substantially in the other direction. As described above, in the cover glass 11, the central area CA and the bent areas BA may include the support portion 220_1 and the cover portion 230_1. The shape of the cover glass 11 is not limited to that illustrated in the drawings. For example, the cover glass 11 may have a curved shape as a whole without including a flat surface.

Similar to the step illustrated in FIG. 9, after the support portion 220_1 is formed, the glass wool 230a_1 may be applied to the entire surface of the support portion 220_1. Shown in FIG. 14, by applying heat to the glass wool 230a_1 and melting the glass wool 230a_1, the cover portion 230_1 may be formed throughout the front surface of the cover glass 11. Similar to the embodiment illustrated in FIG. 2, the surface roughness of the cover glass 11 may be decreased due to the cover portion 230_1.

FIG. 15 is a cross-sectional view of a cover glass 12 according to an exemplary embodiment of the present invention.

Referring to FIG. 15, a cover glass 12 according to the present embodiment differs from the cover glass 10 according to the embodiment illustrated in FIG. 3 in that the bent areas BA1 and BA2 are shapes with several bends.

In the cover glass 12 of the present embodiment, a support portion 220_2 having a shape which is bent several times may be formed using the 3D printer 300. The support portion 220_2 may be formed such that, beginning from a side surface of the base 211b, the support portion 220_2 is bent substantially toward the central area CA, and then is bent again in a direction opposite to the direction substantially toward the central area CA. For example, the bent areas BA1 and BA2 of the cover glass 12 may have an S-like shape, but a shape attributed to bends in the present embodiment is not limited thereto. The bent areas BA1 and BA2 may have a shape in which S-like shapes are repeatedly formed or a shape in which a radius of curvature of the first bending in one direction and a radius of curvature of the second bending in another direction are different from one another.

When the support portion 220_2 is formed and then the cover portion 230_2 is formed using a method which is the same as that of the process in FIG. 9 using the glass wool 230a, the cover glass 12 may be manufactured.

As described in the above embodiments, in the case in which the cover glasses 10 to 12 are manufactured using the 3D printer 300, the cover glasses 10 to 12 may be manufactured in a variety of shapes. Also, by attaching the glass wool 230a to the surfaces of the cover glasses 10 to 12 and melting the glass wool 230a, the surface roughness of the cover glasses 10 to 12 may be lessened.

Cover glasses of various shapes can be provided using a 3D printer. In addition, the surface roughness of the cover glasses can be lessened.

While the present invention has been particularly shown and described in reference to exemplary embodiments thereof, it will be understood by those of ordinary skill in the art that various changes in form and detail may be made therein without departing from the scope of the present invention as defined by the following claims.

What is claimed is:

1. A cover glass including glass wool, the cover glass comprising:
    a first area; and
    a second area connected to the first area and bent away from the first area,
    wherein the second area includes a plurality of protrusions and valleys between the protrusions which are adjacent, and
    wherein the second area further includes the glass wool to fill the valleys between the protrusions.

2. The cover glass of claim 1, wherein a diameter of the glass wool is in a range of 1 μm to 10 μm.

3. The cover glass of claim 1, wherein the first area is a flat area, the second area is bent in a C-shape toward the first area, and an outer edge of the second area overlaps with the first area.

4. The cover glass of claim 1, wherein the first area is a bent area.

5. The cover glass of claim 1, further comprising:
    a third area connected to a first side of the first area and bent away from the first area,
    wherein the second area is connected to a second side of the first area.

6. The cover glass of claim 5, wherein a portion of the first area is an area which does not include the glass wool.

7. The cover glass of claim 1, wherein:
    a height between one of the valleys and its adjacent protrusion is in a range of 1.85 μm to 2.05 μm.

* * * * *